Feb. 17, 1931.   F. E. ZAISS   1,792,672
CANDY MACHINE
Filed Sept. 12, 1928   2 Sheets-Sheet 1
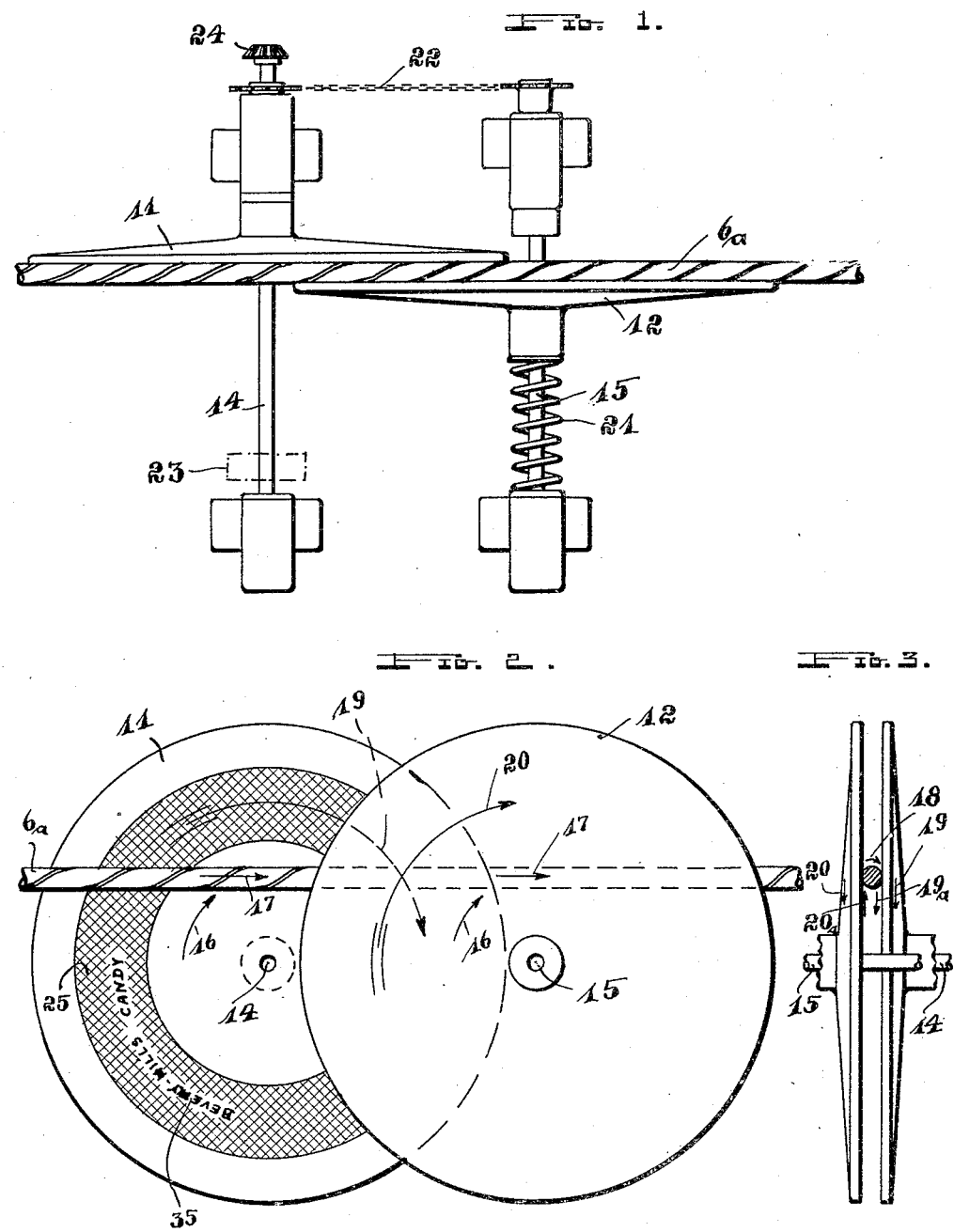
INVENTOR:
FRED E. ZAISS,
By: Otto H. Ruger,
his Atty.

Feb. 17, 1931.  F. E. ZAISS  1,792,672
CANDY MACHINE
Filed Sept. 12, 1928   2 Sheets-Sheet 2
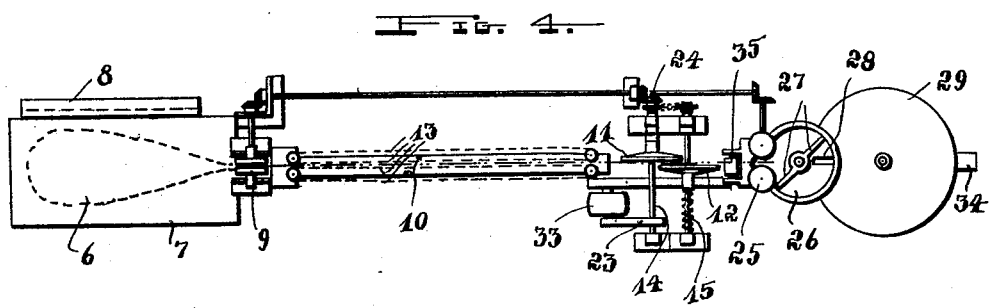
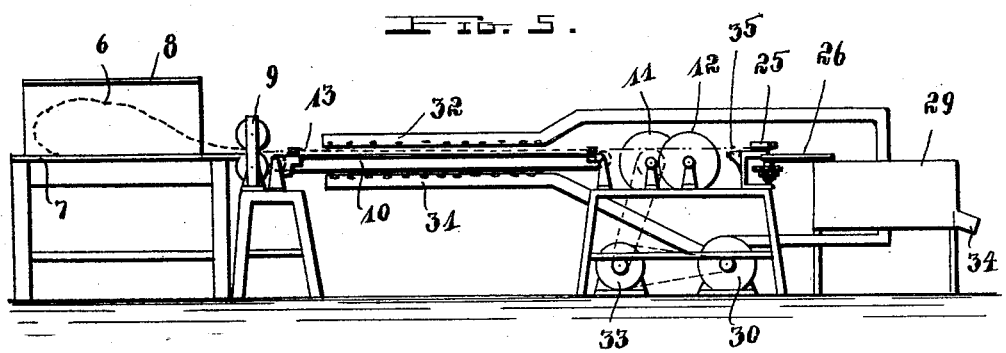
INVENTOR:
FRED E. ZAISS, Patented Feb. 17, 1931

1,792,672

UNITED STATES PATENT OFFICE

FRED E. ZAISS, OF BEVERLY HILLS, CALIFORNIA

CANDY MACHINE

Application filed September 12, 1928. Serial No. 305,476.

This invention relates to devices used for heating, drawing, sizing and cutting candy material.

One of the objects of this invention is to provide a simple apparatus so designed that it may be used for making different types of candies, such as short or long pieces of various cross-sections.

Another object is to provide a mechanism by which candy can be twisted by means of plain disks.

Another object is to provide a mechanism whereby candy is fed through a space between two oppositely arranged flat disks away from the center of the disks, so as to cause a drawing of the candy as well as a twisting.

Another object is to provide an apparatus of comparatively short and compact design whereby the product can be produced through the several steps of manufacture with the sizer, twister, cutter and cooler mechanisms arranged closely in relation to one another.

Other objects will appear from the following description and appended claims as well as from the accompanying drawing, in which—

Fig. 1 is a fragmentary detail top plan view of a pair of disks by which candy material can be twisted according to this invention.

Fig. 2 is a front elevation of the disks illustrated in Fig. 1, showing the relative position of the candy material as it passes between the disks away from the center of the disks.

Fig. 3 is an edge elevation of the disks.

Fig. 4 is a somewhat diagrammatic top plan view of an assembly illustrating an apparatus whereby candy material can be heated, rolled down to size, twisted, cut to desired length, transferred to a cooler, and cooled according to this invention.

Fig. 5 is a front elevation of the apparatus illustrated in Fig. 4.

Considering that candy material has to be heated to make it pliable and workable while, before it can be packed as a finished product, it must again be cooled down to a suitable temperature not to be too sticky, it will be realized that a comparatively large space is needed in the manufacture of candy.

One of the principal objects of this invention is therefore to reduce such a working space as far as possible.

In practice large bulks of candy material are handled, up to eventually several hundred pounds. Such a bulk, of course, can not be heated through and through and at the same time be in a condition that it may be handled in a machine, for which reason a large bulk of candy material is preferably turned over or moved about in a suitable manner that the bulk may be warmed or heated on the different sides of the bulk.

As illustrated in Figs. 4 and 5 such a bulk of candy material is indicated at 6 on the top of a table 7. A heat-radiator 8 is provided in an upright position along one side of the table so that heat may be radiated towards one side of the bulk of candy material on the table.

By turning this bulk over and over the candy material can be suitably heated on all sides to make it pliable enough that a desired amount of material can be drawn away from the bulk to be pressed into a suitable apparatus.

Candies are, of course, made of various forms, such as sticks or kisses, the kisses being commonly of a short form while the sticks are of various forms, such as straight or twisted. For this reason several mechanisms are provided in order that various sorts of candy may be produced by the apparatus.

A sizer 9 is indicated in a position adjacent to the table 7 whereby the drawn-off candy material can be rolled to a certain size and form, as round or cornered as, for instance, of a three-cornered cross-section. Various cross-sections can thereby be given to a finished product.

A conveyer 10 serves to transfer the sized candy material to the twisting disks 11 and 12. Small guiding belts 13 are provided to keep the candy material on the conveyer since the candy material at this point is liable to be rather soft so that it might move sidewise and eventually fall from the conveyer if not guided. The twister disks in this case are more clearly illustrated in Figs. 1, 2 and 3.

In making candy sticks the candy is customarily drawn through the sizer over a long distance for several reasons, one of which being to let the material cool suitably before handled further and, another reason, to somewhat equalize the drawn material.

With the twisting disks illustrated in the drawing the drawn candy material is preferably passed between the disks in a line away from the center of the disks.

In Figs. 2 and 3, for instance, the drawn candy material $6_a$ is away or above the shafts 14 and 15 so that the disks, rotating in the direction of the arrows 16, have a tendency to draw the candy material in the direction of the arrows 17. At the same time, since the two disks 11 and 12 overlap, the portion of the candy material between these overlapping sections of the disks is subjected to a twisting or turning in the direction of the arrow 18 in Fig. 3. The arrow 19 in Fig. 2, for instance, indicates approximately the central line between the overlapping sections of the disks with reference to the disk 11 and the arrow 20 indicates a similar central line with reference to the disk 12. The central friction line 19 with reference to the disk 11 may be said to pass on the side of the candy material $6_a$ in a downward direction as indicated at $19_a$ in Fig. 3, while the central friction line 20 of the disk 12 may be said to move over the opposite side of the candy material $6_a$ in an upwardly direction, as indicated by the arrow $20_a$ in Fig. 3, so as to result in a common turning action in the direction of the arrow 18 on this candy material as far as it is between the overlapping sections of the two disks 11 and 12.

Under this condition the drawn candy material $6_a$ is moved through the space between the twisting disks simultaneously in a forward manner as well as in a twisting manner.

The disk 12 is under the tension of the spring 21 whereby the disk 12 is pressed in the direction towards the disk 11, producing a suitable friction for the disks to properly move and twist the candy material while the candy material passes between the disks.

The spring serves also to suitably press on the candy material to desirably roll out any unevenness on the surfaces of the candy material. The two disks are operatively connected, as by a chain or belt, roughly indicated at 22, so that both disks move in a uniform manner when operated by means of a drive through the pulley 23 on one of the shafts.

A gear 24 is indicated at one end of the shaft 14 to connect this twisting mechanism positively with other mechanisms of the whole apparatus, as, for instance, with the sizer 9 and the conveyer 10 so that these cooperating mechanisms will uniformly handle candy material after it leaves the table 7.

Though the faces of the disks may be smooth as far as the operation is concerned, to assure a positive gripping of the smooth drawn candy material, the faces of the disks may be provided with any suitable gripping surfacing material or may be roughened as indicated at 25.

Such roughening may also include beautifying or ornamenting designs engraved on the faces of the disks and certain titles, or trade-marks, or other wording may be provided on the faces of the disks as indicated at 35 according to the wishes of purchasers of machines of this type.

When so roughened or when additional surfacing material is added to the faces of the disks so that the disks eventually will not touch the candy material at the point indicated by the arrow 17, it must be understood that the central lines 19 and 20 cross in a direction so that a sufficient and satisfactory forward movement can be produced simultaneously with the twisting at the point of the crossing central lines 19 and 20, as will be clear from the illustration in Fig. 2 since both arrows of the central lines point in a forward direction at this crossing point.

After the candy material has left the twisting mechanism it is passed through a cutting mechanism indicated at 25 whereby the candy material is cut to length in a desired manner. No particular cutting mechanism is detailed in this case since various forms of cutters may be provided.

After the cut candy drops from the cutting mechanism on the transfer table 26 it is here moved to a radial position by the transfer arms 27 so that it may drop through the slot 28 into a cooler 29.

The cooling mechanism includes an air motor 30 with a draw pipe 31 and a discharge pipe 32. The draw and discharge pipes terminate near the conveyer 10 whereby dampness and hot air may be drawn from the underside of the candy material as it passes over the conveyer and thereby cool air may be discharged over the top of the candy material on the conveyer. The conveyer is for this reason preferably made of porous material, such as porous cloth or perforated sheet material so that the draw pipe 31 may draw through the conveyer for drawing of hot air and dampness from the passing candy material.

A motor is indicated at 33 whereby the several mechanisms of the whole apparatus can be uniformly operated.

The cooler is provided with a discharge 34 to deliver the cut and cooled candy into suitable receptacles.

No particular sizer is detailed or described in this application since, for one reason, various forms may be used and, for another reason, the whole apparatus is designed so that the sizer may be replaced by a suitable device for making short pieces of candy, so-called kisses.

In case kisses are to be made by this apparatus, the belt 10 is extended over the extra pulley 35 near the cutter mechanism 25, and, of course, the regular cutting mechanism 25 is in such a case removed from the apparatus so that the short kisses can be conveyed from the substituted sizing kiss cutter over the belt 10 directly to the transfer table 26 and from there into a cooler 29.

The disks 11 and 12 are during such operations separated, that is, moved apart to a suitable extent so that a belt may be passed through from the sizing kiss cutter to the pulley 35.

Having thus described my invention, I claim:

1. In a candy machine, a twisting mechanism consisting of rotating disks yieldable axially in relation to one another disposed with their flat faces opposite one another and with their individual central axes offset to one another and disposed so that a material can be passed between the disks away from the center through the overlapping portions of the disks in such a manner that the material will move forwardly in one direction in a plane parallel to the faces of the disks away from the axes of the disks and so that the candy will be rotated by the disks simultaneously with the forward movement through the disks.

2. In a candy machine, a pair of disks yieldable axially in relation to one another having individual shafts offset to one another and disposed to rotate in the same direction whereby a material can be rotated by the disks and moved in a direction parallel to the oppositely disposed faces of the disks when passed through the disks away from the center of the said shafts with respect to the common line through the centers of rotation of the disks.

3. In a candy machine, a heating table, a sizer, twisting disks operatively connected to the sizer, a conveyer disposed between the sizer and the twisting disks, a cutter, a transfer mechanism including arms whereby cut material is moved to a radial position, a cooler having means to receive such radially disposed candy and having discharging means for discharging the cooled candy ready for packing, and a ventilating mechanism including a suction pipe extending below the conveyer for drawing off hot air and dampness from the conveyed candy material and including a discharge pipe extending through the cooler and to above the conveyer for discharging cool air to the cooler and to the top surface of the candy material on the conveyer.

In testimony that I claim the foregoing as my invention I have signed my name.

FRED E. ZAISS.